(12) United States Patent
Rahimi et al.

(10) Patent No.: US 11,364,904 B2
(45) Date of Patent: Jun. 21, 2022

(54) PATH-PLANNING FUSION FOR A VEHICLE

(71) Applicant: GM GLOBAL TECHNOLOGY OPERATIONS LLC, Detroit, MI (US)

(72) Inventors: Amir M. Rahimi, Malibu, CA (US); Aashish N. Patel, Los Angeles, CA (US); Rajan Bhattacharyya, Sherman Oaks, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 426 days.

(21) Appl. No.: 16/365,059

(22) Filed: Mar. 26, 2019

(65) Prior Publication Data
US 2020/0307574 A1   Oct. 1, 2020

(51) Int. Cl.
*B60W 30/095* (2012.01)
*G05D 1/02* (2020.01)
*B60W 30/09* (2012.01)

(52) U.S. Cl.
CPC ........ *B60W 30/0956* (2013.01); *B60W 30/09* (2013.01); *G05D 1/0274* (2013.01); *G05D 2201/0213* (2013.01)

(58) Field of Classification Search
CPC . B60W 30/0956; B60W 30/09; G05D 1/0274
See application file for complete search history.

(56) References Cited

U.S. PATENT DOCUMENTS

| | | | | |
|---|---|---|---|---|
| 2018/0322642 A1* | 11/2018 | Kolouri | ............... | G06K 9/6245 |
| 2019/0025841 A1* | 1/2019 | Haynes | ............... | G01C 21/3492 |
| 2020/0089246 A1* | 3/2020 | McGill, Jr. | ............... | G06N 3/08 |
| 2020/0307564 A1* | 10/2020 | Rahimi | ........... | B60W 30/18163 |
| 2020/0310420 A1* | 10/2020 | Scorcioni | ........... | B60W 60/0011 |
| 2020/0310448 A1* | 10/2020 | Yamada | ............... | G05D 1/0088 |

OTHER PUBLICATIONS

Atrey et al., "Multimodal fusion for multimedia analysis: a survey." Multimedia Systems, (2010), 16, pp. 345-379.

(Continued)

*Primary Examiner* — Peter D Nolan
*Assistant Examiner* — Tarek Elarabi
(74) *Attorney, Agent, or Firm* — Cantor Colburn LLP

(57) ABSTRACT

Embodiments include methods, systems, and computer readable storage medium for a method for providing path-planning guidance by resolving multiple behavioral predictions associated with operating a vehicle is disclosed. The method includes installing a vehicle system into a vehicle, wherein the vehicle system provides path planning guidance based on training data using and fused hypotheses and/or decisions associated with the training data. The method further includes determining, by a processor, a location of the vehicle on a map containing a road network, and determining, by the processor, whether one or more agents exist within a predetermined range of the vehicle. The method further includes selecting, by the processor, an output trajectory to traverse the road network based on the location of the vehicle on the map and the existence of one or more agents. The method further includes controlling, by the processor, operation of the vehicle using the output trajectory.

17 Claims, 5 Drawing Sheets

(56) References Cited

OTHER PUBLICATIONS

Correa et al. "Canonical Correlation Analysis for Data Fusion and Group Inferences," IEEE Signal Processing Magazine, Digital Object Identifier 10.1109/MSP.2010.936725, Jul. 2010, pp. 39-50.
Glaser et al., "Maneuver based trajectory planning for highly autonomous vehicles on real road with traffic and driver interaction," IEEE Transactions on Intelligent Transportation Systems, vol. X, No. X, XXX 2009, pp. 1-15.
Hardoon et al., "Canonical Correlation Analysis: An Overview with Application to Learning Methods," Neural Computation, 16, © 2004 Massachusetts Institute of Technology, pp. 2639-2664 (92 pgs.).
Pushpalatha et al., "An Information Theoretic Similarity Measure for Unified Multimedia Document Retrieval," 978-1-4799-4598-6/14, © 2014 IEEE, 6 pgs.
Štěpán et al., "Robust Data Fusion with Occupancy Grid," IEEE Transactions on Systems, Man, and Cybernetics—Part C: Applications and Reviews, vol. 35, No. 1, Feb. 2005, pp. 106-115.

\* cited by examiner

PATH-PLANNING FUSION FOR A VEHICLE

INTRODUCTION

The subject disclosure relates to path planning, and more specifically to fusing multiple trajectories in order to guide a vehicle to traverse a road network.

Autonomous vehicles have the ability to operate and navigate without human input. Autonomous vehicles, as well as some non-autonomous vehicles, use sensors, such as cameras, radar, LIDAR, global positioning systems, and computer vision, to detect the vehicle's surroundings. Advanced computer control systems interpret the sensory input information to identify a vehicle's location, appropriate navigation paths, as well as obstacles and relevant signage. Some autonomous vehicles update map information in real time to remain aware of the autonomous vehicle's location even if conditions change or the vehicle enters an uncharted environment. Autonomous vehicles, as well as non-autonomous vehicles, increasingly communicate with remote computer systems and with one another using V2X communications—Vehicle-to-Everything, Vehicle-to-Vehicle (V2V), Vehicle-to-Infrastructure (V2I).

As autonomous and semi-autonomous vehicles become more prevalent, having an accurate location of each vehicle on a road network and where a vehicle is traveling (i.e., a vehicle path) is important. Accordingly, it is desirable to provide further improvements for path planning while a vehicle is traversing the road network.

SUMMARY

In one exemplary embodiment, a method for providing path-planning guidance by resolving multiple behavioral predictions associated with operating a vehicle is disclosed. The method includes installing a vehicle system into a vehicle, wherein the vehicle system provides path planning guidance based on training data using and fused hypotheses and/or decisions associated with the training data. The method further includes determining, by a processor, a location of the vehicle on a map containing a road network. The method further includes determining, by the processor, whether one or more agents exist within a predetermined range of the vehicle. The method further includes selecting, by the processor, an output trajectory to traverse the road network based on the location of the vehicle on the map and the existence of one or more agents. The method further includes controlling, by the processor, operation of the vehicle using the output trajectory.

In addition to one or more of the features described herein, one or more aspects of the described method recognize that the training data includes data based on one or more predictive models that are used to predict a future movement associated with the one or more agents. Another aspect of the method uses a Canonical Correlation Analysis (CCA) algorithm is used to fuse the hypotheses and/or decisions associated with the training data. Another aspect of the method is that the CCA provides a mapping between one or more predictive models and behaviors exhibited by one or more drivers. Another aspect of the method is that the CCA utilizes pairwise interactions between predictors. Another aspect of the method is that the movement information from one or more agent includes speed, heading, and location information. Another aspect of the method is that one or more agents are mobile agents or stationary agents.

In another exemplary embodiment, a system for providing path-planning guidance by resolving multiple behavioral predictions associated with operating a vehicle is disclosed herein. The system includes a vehicle having a memory, a processor coupled to the memory, a hypothesis resolver, a decision resolver, a trajectory planner and a controller. The processor associated with the vehicle is operable to utilize a vehicle system into a vehicle, wherein the vehicle system provides path planning guidance based on training data using and fused hypotheses and/or decisions associated with the training data. The processor is further operable to determine a location of the vehicle on a map containing a road network. The processor is further operable to determine whether one or more agents exist within a predetermined range of the vehicle. The processor is further operable to select an output trajectory to traverse the road network based on the location of the vehicle on the map and the existence of one or more agents. The processor is further operable to control operation of the vehicle using the output trajectory.

In yet another exemplary embodiment a computer readable storage medium for performing a method for providing path-planning guidance by resolving multiple behavioral predictions associated with operating a vehicle is disclosed herein. The computer readable storage medium includes installing a vehicle system into a vehicle, wherein the vehicle system provides path planning guidance based on training data using and fused hypotheses and/or decisions associated with the training data. The computer readable storage medium further includes determining a location of the vehicle on a map containing a road network. The computer readable storage medium further includes determining whether one or more agents exist within a predetermined range of the vehicle. The computer readable storage medium further includes selecting an output trajectory to traverse the road network based on the location of the vehicle on the map and the existence of one or more agents. The computer readable storage medium further includes controlling operation of the vehicle using the output trajectory.

The above features and advantages, and other features and advantages of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which.

DETAILED DESCRIPTION

Figure 1:
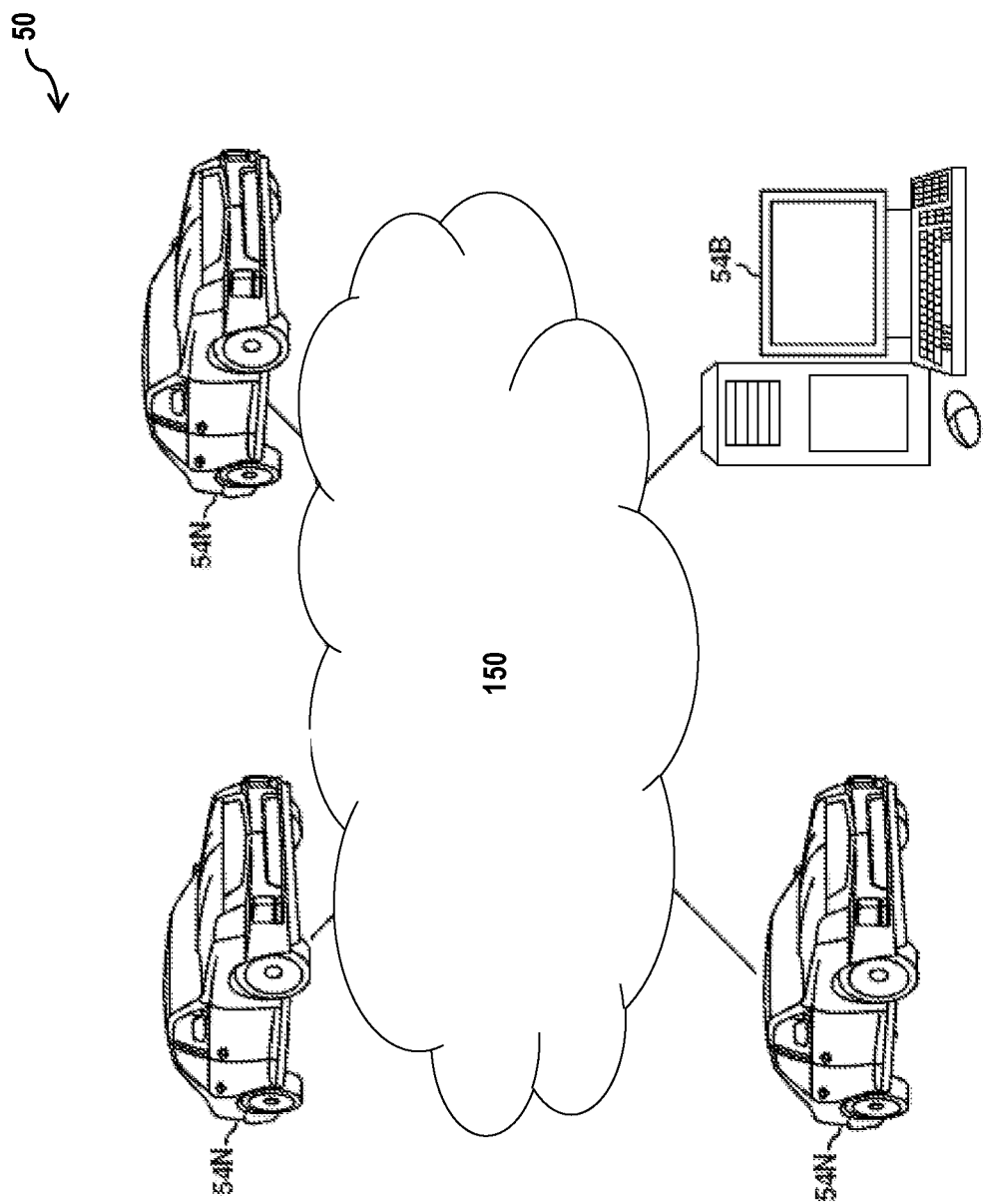
FIG. 1 is a computing environment according to one or more embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment, FIG. 1 illustrates a computing environment 50 associated with a system for providing path-planning guidance by resolving multiple behavioral predictions associated with operating a vehicle according to one or more embodiments. As shown, the computing environment 50 comprises one or more computing devices, for example, a server/cloud 54B, and/or a vehicle onboard computer system 54N incorporated into each of a plurality of autonomous or non-autonomous vehicles, which are connected via network 150. The one or more computing devices can communicate with one another using network 150.

Network 150 can be, for example, a cellular network, a local area network (LAN), a wide area network (WAN), such as the Internet and WIFI, a dedicated short-range communications network (for example, V2V communication (vehicle-to-vehicle), V2X communication (i.e., vehicle-to-everything), V2I communication (vehicle-to-infrastructure), and V2P communication (vehicle-to-pedestrian)), or any combination thereof, and may include wired, wireless, fiber optic, or any other connection. Network 150 can be any combination of connections and protocols that will support communication between server/cloud 54B, and/or the plurality of vehicle onboard computer systems 54N, respectively.

When a cloud is employed instead of a server, server/cloud 54B can serve as a remote computing resource. Server/cloud 54B can be implemented as a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

Figure 2:
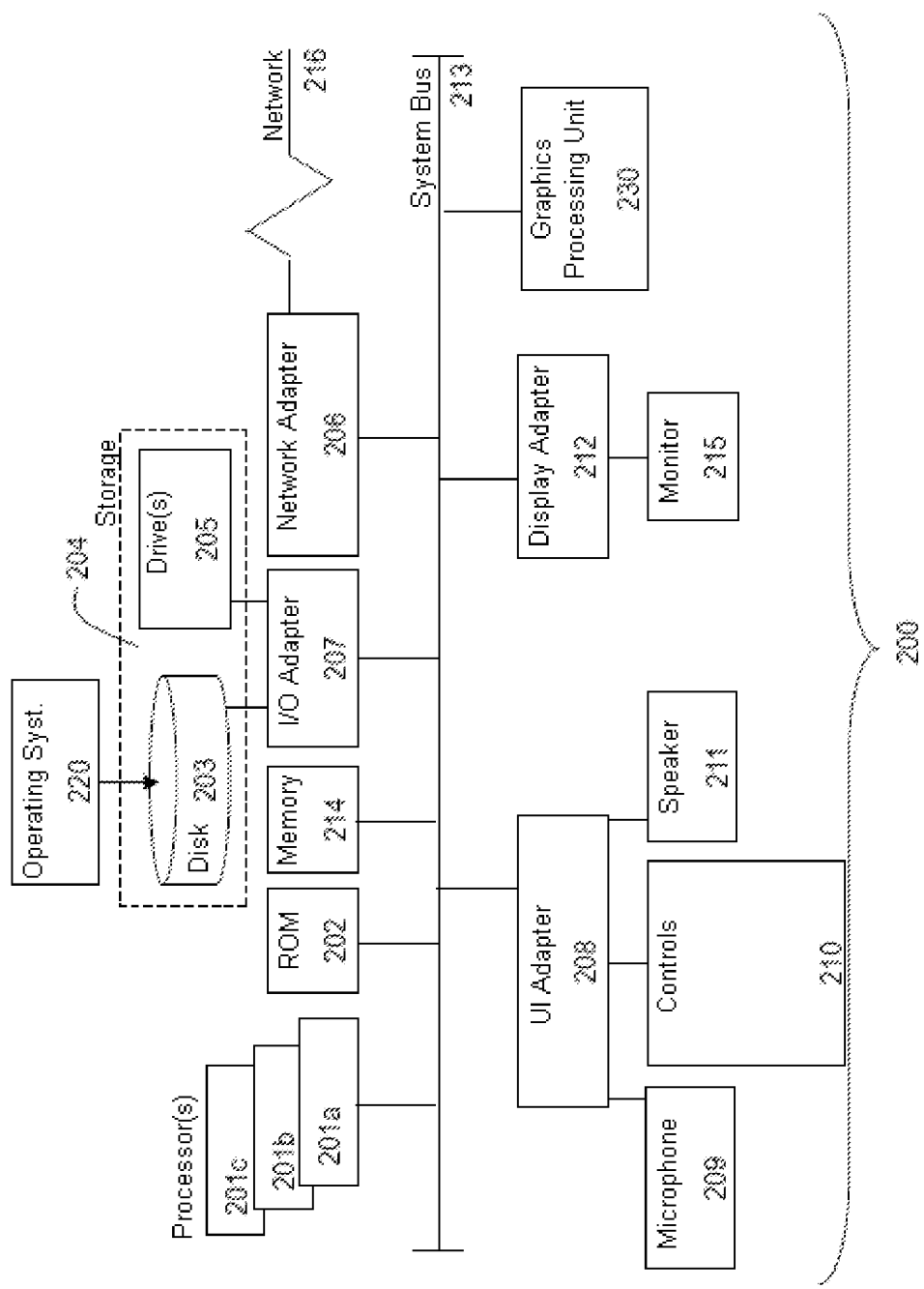
FIG. 2 is a block diagram illustrating one example of a processing system for practice of the teachings herein.

In accordance with an exemplary embodiment, FIG. 2 illustrates a processing system 200 for implementing the teachings herein. The processing system 200 can form at least a portion of the one or more computing devices, such as server/cloud 54B, and/or vehicle onboard computer system 54N. The processing system 200 may include one or more central processing units (processors) 201a, 201b, 201c, etc. (collectively or generically referred to as processor(s) 201). Processors 201 are coupled to system memory 214 and various other components via a system bus 213. Read only memory (ROM) 202 is coupled to the system bus 213 and may include a basic input/output system (BIOS), which controls certain basic functions of the processing system 200.

FIG. 2 further depicts an input/output (I/O) adapter 207 and a network adapter 206 coupled to the system bus 213. I/O adapter 207 may be a small computer system interface (SCSI) adapter that communicates with a hard disk 203 and/or other storage drives 205 or any other similar component. I/O adapter 207, hard disk 203, and other storage drive 205 are collectively referred to herein as mass storage 204. Operating system 220 for execution on the processing system 200 may be stored in mass storage 204. The network adapter 206 interconnects system bus 213 with an outside network 216, which can be network 150, enabling processing system 200 to communicate with other such systems. A screen (e.g., a display monitor) 215 can be connected to system bus 213 by display adaptor 212, which may include a graphics adapter to improve the performance of graphics intensive applications and a video controller. In one embodiment, network adapter 206, I/O adapter 207, and display adapter 212 may be connected to one or more I/O busses that are connected to system bus 213 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 213 via user interface adapter 208 and display adapter 212. A microphone 209, steering wheel/dashboard controls 210, and speaker 211 can all be interconnected to system bus 213 via user interface adapter 208, which may include, for example, a Super I/O chip integrating multiple device adapters into a single integrated circuit.

The processing system 200 may additionally include a graphics-processing unit 230. The graphics-processing unit 230 is a specialized electronic circuit designed to manipulate and alter memory to accelerate the creation of images in a frame buffer intended for output to a display. In general, graphics-processing unit 230 is very efficient at manipulating computer graphics and image processing and has a highly parallel structure that makes it more effective than general-purpose CPUs for algorithms where processing of large blocks of data is done in parallel.

Thus, as configured in FIG. 2, the processing system 200 includes processing capability in the form of processors 201, storage capability including the system memory 214 and mass storage 204, input means such as microphone 209 and steering wheel/dashboard controls 210, and output capability including speaker 211 and display monitor 215. In one embodiment, a portion of system memory 214 and mass storage 204 collectively store an operating system to coordinate the functions of the various components shown in FIG. 2.

Figure 3:
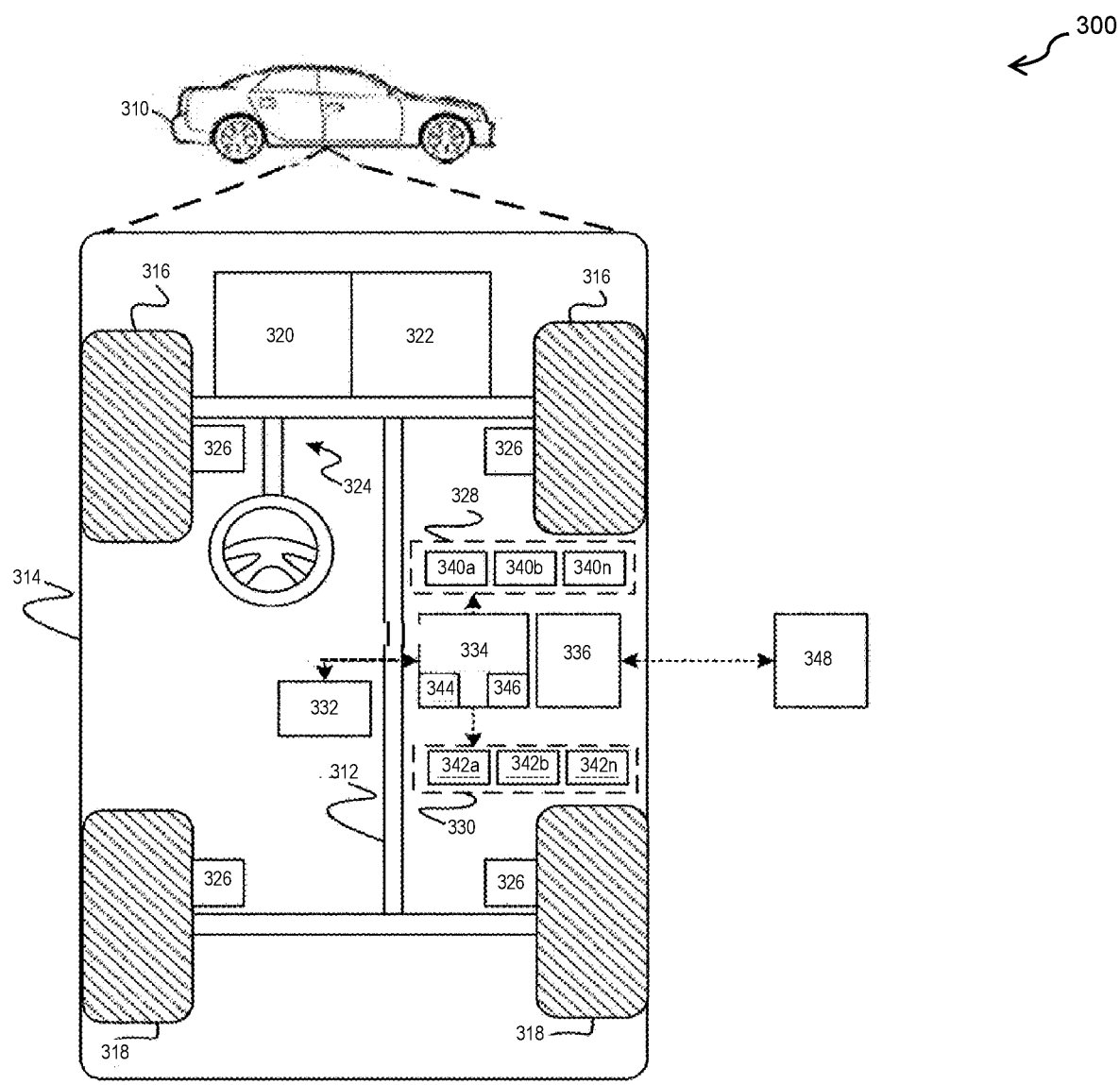
FIG. 3 depicts a schematic view of an exemplary vehicle system according to one or more embodiments.

FIG. 3 depicts components of a system 300 associated with autonomous or non-autonomous vehicles incorporating the vehicle onboard computer system 54N according to one or more embodiments. Vehicle 310 generally includes a chassis 312, a body 314, front wheels 316, and rear wheels 318. The body 314 can be arranged on the chassis 312 and can substantially enclose components of the vehicle 310. The body 314 and the chassis 312 may jointly form a frame. The wheels 316 and 318 are each rotationally coupled to the chassis 312 near a respective corner of the body 314.

The system for path planning by resolving multiple behavioral predictions associated with operating a vehicle can be incorporated into the vehicle 310. The vehicle 310 is depicted as a passenger car, but it should be appreciated that vehicle 310 can be another type of vehicle, for example, a motorcycle, a truck, a sport utility vehicle (SUV), a recreational vehicle (RV), a marine vessel, an aircraft, etc.

Vehicle 310 can operate according to various levels of the scales of vehicle automation, for example, Level 4 or Level 5. Operation at a Level 4 system indicates "high automation", referring to a driving mode-specific performance by an automated driving system of all aspects of the dynamic driving task, even if a human driver does not respond appropriately to a request to intervene. Operation at a Level 5 system indicates "full automation", referring to the full-time performance by an automated driving system of all aspects of the dynamic driving task under all roadway and environmental conditions that can be managed by a human driver.

Vehicle 310 can also include a propulsion system 320, a transmission system 322, a steering system 324, a brake system 326, a sensor system 328, an actuator system 330, at least one data storage device 332, at least one controller 334, and a communication system 336. The propulsion system 320 can be an internal combustion engine, an electric machine such as a traction motor, and/or a fuel cell propulsion system. The transmission system 322 can be configured to transmit power from the propulsion system 320 to the vehicle wheels 316 and 318 according to selectable speed ratios. The transmission system 322 may include a step-ratio automatic transmission, a continuously variable transmission, or other appropriate transmissions. The brake system 326 can be configured to provide braking torque to the vehicle wheels 316 and 318. The brake system 326 can utilize friction brakes, brake by wire, a regenerative braking system such as an electric machine, and/or other appropriate braking systems. The steering system 324 influences a position of the of the vehicle wheels 316 and 318.

The sensor system 328 can include one or more sensing devices 340a-340n that sense observable conditions of the exterior environment and/or the interior environment of the vehicle 310. The sensing devices 340a-340n can include but are not limited to, speed, radars, LIDARs, global positioning systems, optical cameras, thermal cameras, ultrasonic sensors, inertial measurement units, and/or other sensors. The actuator system 330 includes one or more actuator devices 342a-342n that control one or more vehicle features such as, but not limited to, the propulsion system 320, the transmission system 322, the steering system 324, and the brake system 326. In various embodiments, the vehicle features can further include interior and/or exterior vehicle features such as, but are not limited to, doors, a trunk, and cabin features such as air, music, lighting, etc. (not numbered).

The sensor system 328 can be used to obtain a variety of vehicle readings and/or other information. The sensing devices 340a-340n can generate readings representing a position, velocity and/or acceleration of the vehicle 310. The sensing devices 340a-340n can also generate readings representing lateral acceleration, yaw rate, etc. The sensing devices 340a-340n can utilize a variety of different sensors and sensing techniques, including those that use rotational wheel speed, ground speed, accelerator pedal position, gear position, shift lever position, accelerometers, engine speed, engine output, and throttle valve position and inertial measurement unit (IMU) output, etc. The sensing devices 340a-340n can be used to determine vehicle speed relative to the ground by directing radar, laser and/or other signals towards known stationary objects and analyzing the reflected signals, or by employing feedback from a navigational unit that has GPS and/or telematics capabilities, via a telematics module, that can be used to monitor the location, movement, status and behavior of the vehicle.

The communication system 336 can be configured to wirelessly communicate information to and from other entities 348, such as but not limited to, other vehicles ("V2V" communication,) infrastructure ("V2I" communication), remote systems, and/or personal devices. The communication system 336 can be a wireless communication system configured to communicate via a wireless local area network (WLAN) using IEEE 802.11 standards or by using cellular data communication. However, additional or alternate communication methods, such as dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 332 can store data for use in automatically controlling the autonomous vehicle 310. The data storage device 332 can also store defined maps of the navigable environment. The defined maps can be obtained from a remote system. For example, the defined maps may be assembled by the remote system and communicated to the autonomous vehicle 310 (wirelessly and/or in a wired manner) and stored in the data storage device 332. Route information may also be stored within data storage device 332, i.e., a set of road segments (associated geographically with one or more of the defined maps) that together define a route that a user may take to travel from a start location (e.g., the user's current location) to a target location. The data storage device 332 may be part of controller 334, separate from controller 334, or part of the controller 334 and part of a separate system.

The controller 334 can include at least one processor 344 and a computer readable storage device or media 346. The processor 344 can be any custom made or commercially available processor, a central processing unit (CPU), a graphics processing unit (GPU), an auxiliary processor among several processors associated with the controller 334, a semiconductor based microprocessor (in the form of a microchip or chip set), a microprocessor, any combination thereof, or generally any device for executing instructions. The instructions may include one or more separate programs, each of which comprises an ordered listing of executable instructions for implementing logical functions. The instructions, when executed by the processor 344, receive and process signals from the sensor system 328, perform logic, calculations, methods and/or algorithms for automatically controlling the components of the autonomous vehicle 310, and generate control signals to the actuator system 330 to automatically control the components of the autonomous vehicle 310 based on the logic, calculations, methods, and/or algorithms.

Vehicle 310 can also include a safety control module (not shown), an infotainment/entertainment control module (not shown), a telematics module (not shown), a GPS module (not shown) (GLONASS can be used as well), etc. The safety control module can provide various crash or collision sensing, avoidance and/or mitigation type features. For example, the safety control module provides and/or performs collision warnings, lane departure warnings, autonomous or semi-autonomous braking, autonomous or semi-autonomous steering, airbag deployment, active crumple zones, seat belt pre-tensioners or load limiters, and automatic notification to emergency responders in the event of a crash, etc.

The infotainment/entertainment control module can provide a combination of information and entertainment to occupants of the vehicle 310. The information and entertainment can be related to, for example, music, web pages, movies, television programs, video games and/or other information.

The telematics module can utilize wireless voice and/or data communication over a wireless carrier system (not shown) and via wireless networking (not shown) to enable the vehicle 310 to offer a number of different services including those related to navigation, telephony, emergency assistance, diagnostics, infotainment, etc. The telematics module can also utilize cellular communication according to GSM, W-CDMA, or CDMA standards and wireless communication according to one or more protocols implemented per 3G or 4G standards, or other wireless protocols, such as any of the IEEE 802.11 protocols, WiMAX, or Bluetooth. When used for packet-switched data communication such as TCP/IP, the telematics module can be configured with a static IP address or can be set up to automatically receive a dynamically assigned IP address from another device on the network, such as from a router or from a network address server (e.g., a DHCP server).

The GPS module can receive radio signals from a plurality of GPS satellites (not shown). From these received radio signals, the GPS module can determine a vehicle position that can be used for providing navigation and other position-related services. Navigation information can be presented on a display within the vehicle 310 (e.g., display 215) or can be presented verbally such as is done when supplying turn-by-turn navigation. Navigation services can be provided using a dedicated in-vehicle navigation module (which can be part of the GPS module), or some or all navigation services can be done via the telematics module. As such, the position information for the vehicle 310 can be sent to a remote location for purposes of providing the vehicle 310 with navigation maps, map annotations (points of interest, restaurants, etc.), route calculations, and the like.

Figure 4:
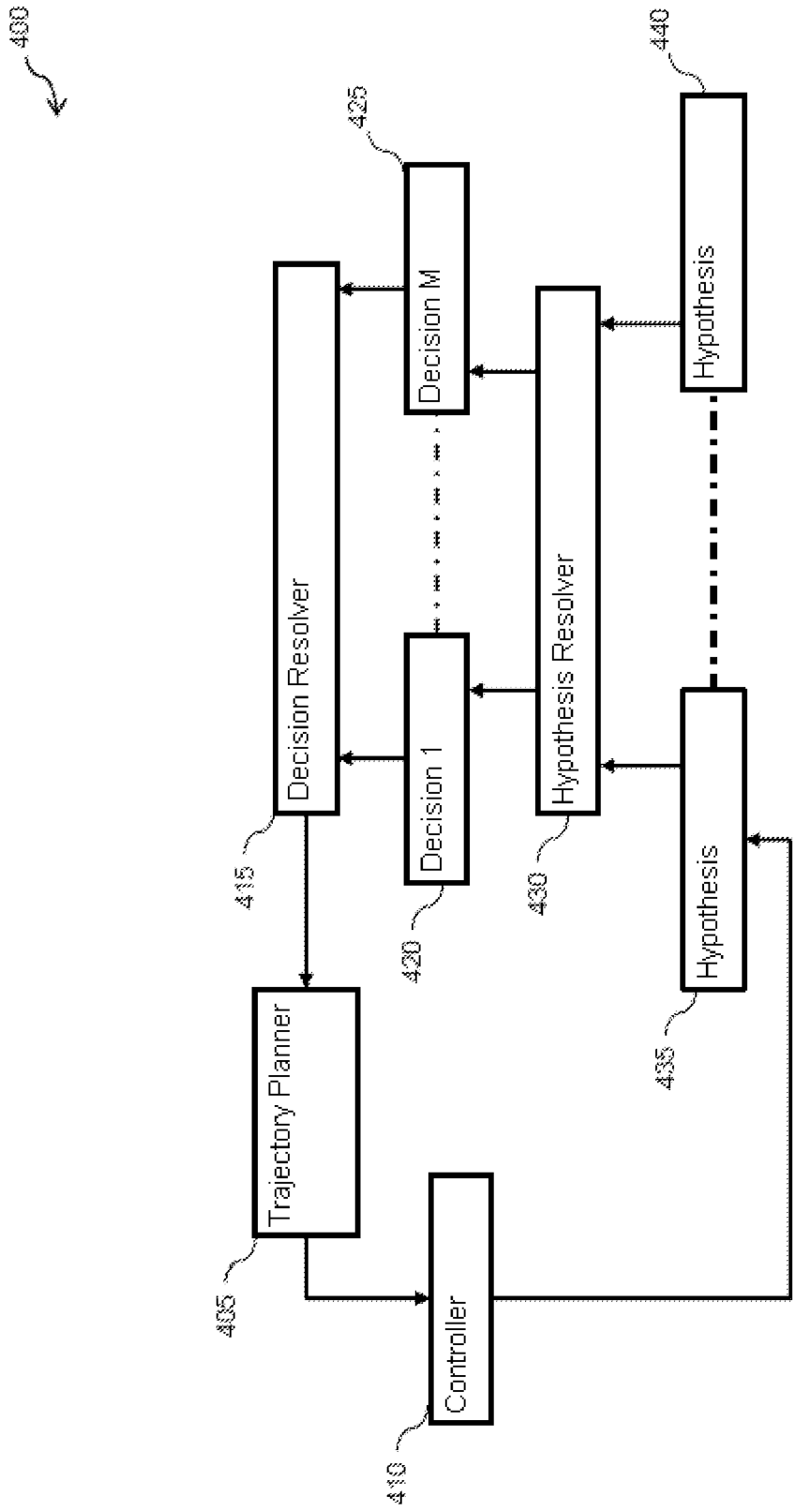
FIG. 4 is a block diagram of vehicle components according to one or more embodiments.

FIG. 4, with continuing reference to FIGS. 1-3, depicts a behavioral path planning resolution system 400 associated with each of a plurality of autonomous or non-autonomous vehicles incorporating the vehicle onboard computer system 54N. The behavioral path planning resolution system 400 can include a plurality of components (e.g., a controller 410, which can be controller 334, a hypothesis resolver 430, a decision resolver 415 and a trajectory planner 405). The behavioral path planning resolution system 400 can provide path planning guidance for a vehicle.

The behavioral path planning resolution system 400 can be initially trained to make path-planning decisions based on data reflecting choices and actions performed by drivers operating a vehicle on a road network in light of a driving situation type (e.g., operation at fork in a road, a three-way stop, an intersection, a highway on-ramp, a highway exit-ramp, a turn-circle, etc.) and/or a given location or location type (e.g., a highway, two-lane road, left-turn lane, urban, etc.) The actions taken by drivers can be in response to interactions with other mobile or stationary objects, road signs, traffic signals, lane geometries, work zones, traffic, etc., (i.e., behavior). When the behavioral path planning resolution system 400 has obtained an amount of training data above a predetermined threshold, the behavioral path planning resolution system 400 can be incorporated into vehicle 310. The behavioral path planning resolution system 400 incorporated into vehicle 310 can be utilized to make vehicle operation decisions (i.e., steering, braking, accelerating, etc.) based on a resolution of multiple hypotheses and/or decisions while the vehicle 310 is operating in an autonomous or semi-autonomous manner.

The behavioral path planning resolution system 400, using training data or live data, can utilize a plurality of movement behavioral models (i.e., predictive models (e.g., Kinematic, Tree Regression, GMM-HMM, etc.)) to develop multiple hypothesis (e.g., 435 and 440) in which each hypothesis can be a path prediction for an agent within a predetermined distance of the vehicle 310. Each path prediction includes a speed, heading, and location predictions along with a computed trajectory for each agent.

Each hypothesis can be input into the hypothesis resolver 430. Each hypothesis can be a spatial trajectory of the agent moving from one location to another location on a map. The hypothesis resolver 430 can select and output the best hypothesis (selection is based on the accuracy of each hypothesis predictions for some past duration) from the plurality of hypothesis (e.g., hypothesis 435 and hypothesis 440) input into the hypothesis resolver 430. The best hypothesis can be a fusion of multiple hypotheses. Accordingly, the hypothesis resolver 430 can output a predicted path based on the fusion of predicted paths associated with the multiple hypotheses.

A hypothesis fusion can be in consideration of N, where N is the total number of data points in which each data point is a single path k. As noted, each hypothesis of the multiple hypotheses represents a different model and true observation. The multiple hypotheses can be represented as a set of vectors Si: $(X_j^i, Y_j^i) \in S_i$ where $S_i \in \mathfrak{R}^N$. Accordingly, each hypothesis $S_i$ is a 2D trajectory described by X, Y on the map. Accordingly, for a given set of unique paths, S, the fusion technique described herein can finds a most probable path based on the multiple hypotheses.

The hypothesis resolver 430 can utilize a Canonical Correlation Analysis (CCA) algorithm to select the best-predicted path. The equation for the CCA can be the following, which, for example, is based on two predictors (hypothesis X predicted the path and hypothesis Y predicted path) and an observed path, i.e., mapped trajectory (Z):

$$CCA = \operatorname{argmax}_s \left\{ \left[ \frac{[U^T X^T Y V]}{\sqrt{U^T X X^T U} \sqrt{V^T Y Y^T V}} \right] + \left[ \frac{U^T X^T Z Z W}{\sqrt{U^T X X^T U} \sqrt{W^T Z Z^T W}} + \frac{V^T Y^T Z W}{\sqrt{V^T Y Y^T V} \sqrt{W^T Z Z^T W}} \right] \right\}$$

where parameters U, V, and W are the top k components of CCA, which can be thought of as weights that are learned inside CCA model. Parameters X and Y are predicted paths for two different hypotheses. Parameter Z is the fused path.

A first addend represents a pairwise correlation of the two predictors, and a second addend represents predictor observation correlations. The result of the CCA provides a complete shared embedding to be utilized to relate all of path predictions and observations into a single fused path based on human decisions and actions gleaned from training data. The shared embedding is a space where trajectories are mapped into a fused (shared) embedding, which can be used to ascertain the mapping between the fused trajectories and the observed trajectories.

The output of the hypothesis resolver 430, (i.e., the best-predicted future path for a given agent), is used to generate multiple decisions, (e.g., decision 1 (420) and decision M (425)). Each generated decision can take into consideration the best predicted future path for any agent located within the predetermined range of the vehicle 310. Each decision can calculate an output trajectory that can be used to plan a path for the vehicle 310. Each decision can provide a valid/realistic (human) output trajectory even when an average output trajectory would be invalid (e.g., selecting a left fork of a road or right fork of the road when an average indicates selecting a path between the left and right fork.)

Each decision can be input into a decision resolver 415. The decision resolver 415 can select the best decision, i.e., a decision that most closely mimics human behavior in light of a given set of events. The selection of the best decision by the decision resolver 415 can also utilize the CCA to fuse multiple decisions in a manner similar to the fusion performed by the hypothesis resolver 430. The decision resolver 415 can input the best decision/fused decision into the trajectory planner 405. The trajectory planner 405 can generate a path/trajectory for the vehicle 310 to traverse a road network using the output trajectory associated with the provided decision. The trajectory planner 405 can input the path/trajectory into the controller 410. The controller 410 can use the received path/trajectory to make vehicle operation decisions that cause the vehicle 310 to traverse the road network.

Figure 5:
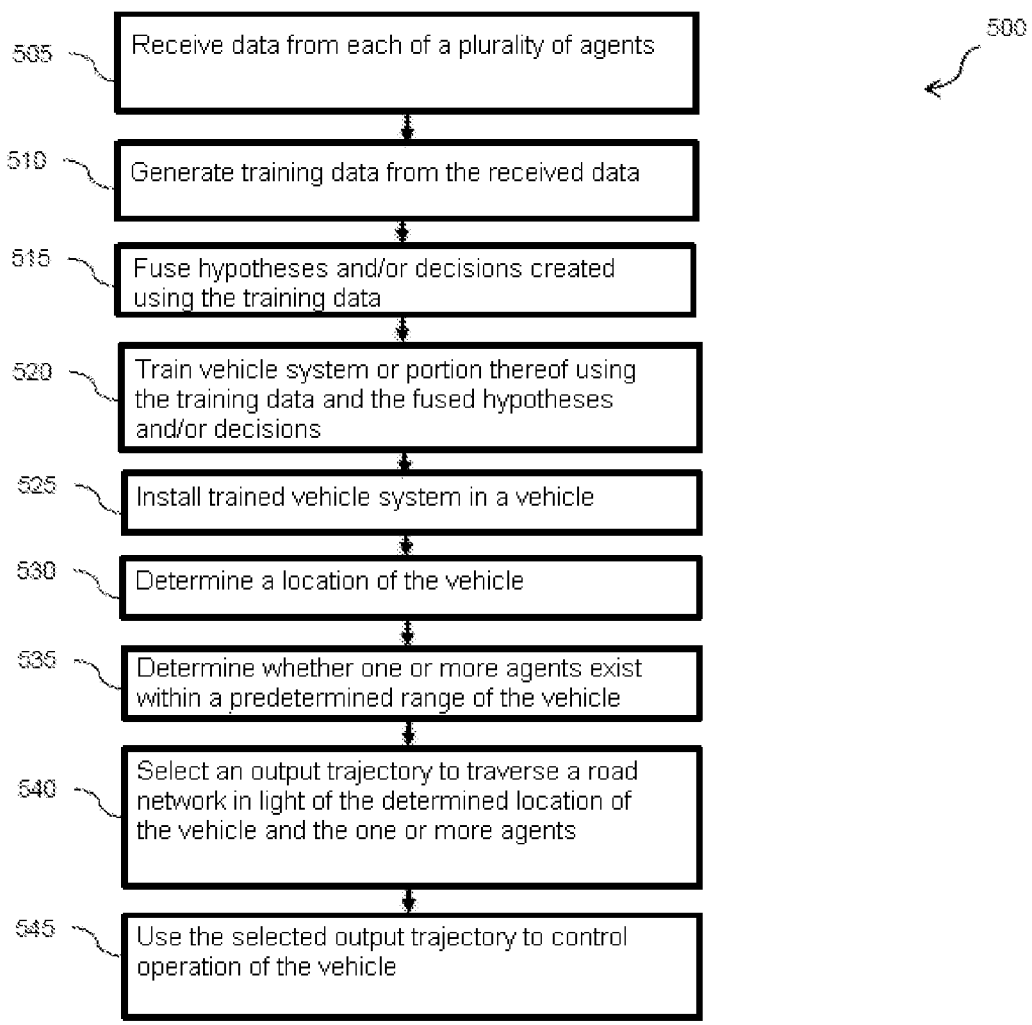
FIG. 5 depicts a flow diagram of a method for providing path-planning guidance by resolving multiple behavioral predictions associated with operating a vehicle according to one or more embodiments.

FIG. 5 depicts a flow diagram of a method 500 for implementing a method for providing path planning guidance by resolving multiple behavioral predictions associated with operating a vehicle according to one or more embodiments. At block 505, a system, (e.g., behavioral path planning resolution system 400), during a training phase, can receive data from each of a plurality of agents. The received data can include speed, heading, and location information. At block 510, the system can generate training data from the received data. At block 515, the system can fuse hypotheses and/or decisions created using the training data.

At block 520, a vehicle system or portion thereof can be trained using the generated training data and the fused hypotheses and/or decisions. Training can be based on simulations of agents (mobile and stationary) interacting with each other on or along a road network. The simulations can be based on random permutations of agents, vehicles and road types. At block 525, the trained vehicle system can be installed in a vehicle, e.g., the vehicle onboard computer system 54N. At block 530, while the vehicle is in operation, (i.e., traversing the road network), the vehicle onboard computer system 54N can determine a location of the vehicle on a map including a road network. At block 535, the vehicle onboard computer system 54N can determine whether one or more agents (mobile or stationary) exist within a predetermined range of the vehicle.

At block 540, the vehicle onboard computer system 54N can utilize the trained vehicle system to select an output trajectory to traverse the road network in light of determined location of the vehicle on the map and the one or more agents. At block 545, the vehicle onboard computer system 54N can use the selected output to control vehicle operation of the vehicle to execute the output trajectory.

Accordingly, the embodiments disclosed herein describe a system that can resolve multiple behavioral predictions utilized for path planning. Embodiments disclosed herein can address the challenge of combining multiple trajectories and providing a single output that integrates significant information in a form of a fused trajectory. The fused trajectory implicitly encounters the inter-dependencies between input trajectories and output trajectories, in addition to intra-dependencies among input trajectories.

The system described herein can utilize individual models that each provides a valid path prediction with unique desirable features that present all or a subset of predictors. After generating all path predictions, input feature vectors are constructed for Canonical Correlation Analysis (CCA) modeling. While CCA can be performed on any set of informative features, embodiments described herein can use an arbitrary set of (x, y) where x's and y's are the trajectories from different predictors. Accordingly, rather than concatenating each of the feature arrays into a single feature vector, each is explicitly represented thereby allows for pairwise correlations of input space.

Technical effects and benefits of the disclosed embodiments include, but are not limited to using behavioral patterns of human operation of vehicles gleaned from training data to control the operation of a vehicle, steering, braking, accelerating, etc. Accordingly, autonomous and non-autonomous vehicle employing the disclosed embodiments operate with increased safety because driving operations are reflective of a most human choice when faced with similar situations and/or a location. Accordingly, once the system is trained, real-world applications such as autonomous driving can be influenced to safely navigate a road network.

The present disclosure may be a system, a method, and/or a computer readable storage medium. The computer readable storage medium may include computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a mechanically encoded device and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer readable program instructions may also be loaded onto a computer, other programmable data processing apparatus, or other device to cause a series of operational steps to be performed on the computer, other programmable apparatus or other devices to produce a computer implemented process, such that the instructions which execute on the computer, other programmable apparatus, or other device implement the functions/acts specified in the flowchart and/or block diagram block or blocks.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for providing path planning guidance by resolving multiple behavioral predictions associated with operating a vehicle, the method comprising:
    installing a vehicle system in a vehicle, wherein the vehicle system provides path planning guidance based on training data using fused hypotheses and/or decisions associated with the training data, the vehicle system including a plurality of movement behavioral models;
    determining, by a processor, a location of the vehicle on a map containing a road network;

determining, by the processor, whether one or more agents exist within a predetermined range of the vehicle;

generating a plurality of hypotheses for an agent within the predetermined range, wherein each hypothesis includes a path prediction of the agent generated by a different model of the plurality of models;

selecting multiple hypotheses from the plurality of hypotheses based on an accuracy of each of the plurality of hypotheses, and fusing the selected hypotheses to generate a fused hypothesis, the fused hypothesis specifying a single fused path prediction for the agent;

selecting, by the processor, an output trajectory based on the fused hypothesis to traverse the road network based on the location of the vehicle on the map and the existence of the agent; and controlling, by the processor, operation of the vehicle using the output trajectory.

2. The method of claim 1, wherein a Canonical Correlation Analysis (CCA) algorithm is used to fuse the selected hypotheses and/or decisions associated with the training data.

3. The method of claim 2, wherein the CCA provides a mapping between one or more predictive models and behaviors exhibited by one or more drivers.

4. The method of claim 2, wherein the CCA utilizes pairwise interactions between predictors.

5. The method of claim 1, wherein the training data includes movement information from the one or more agents, and the movement information includes speed, heading, and location information.

6. The method of claim 1, wherein the one or more agents are mobile agents or stationary agents.

7. A system for providing path planning guidance by resolving multiple behavioral predictions associated with operating a vehicle, the system comprising:
a vehicle; wherein the vehicle comprises:
a memory and a processor coupled to the memory;
a hypothesis resolver;
a decision resolver;
a trajectory planner; and
a controller;
wherein the processor is operable to:
utilize a vehicle system in a vehicle, wherein the vehicle system provides path planning guidance based on training data using and fused hypotheses and/or decisions associated with the training data, the vehicle system including a plurality of movement behavioral models;
determine a location of the vehicle on a map containing a road network;
determine whether one or more agents exist within a predetermined range of the vehicle;
generate a plurality of hypotheses for an agent within the predetermined range, wherein each hypothesis includes a path prediction of the agent generated by a different model of the plurality of models;
select multiple hypotheses from the plurality of hypotheses based on an accuracy of each of the plurality of hypotheses, and fusing the selected hypotheses to generate a fused hypothesis, the fused hypothesis specifying a single fused path prediction for the agent;
select an output trajectory based on the fused hypothesis to traverse the road network based on the location of the vehicle on the map and the existence of the agent; and
control operation of the vehicle using the output trajectory.

8. The system of claim 7, wherein a Canonical Correlation Analysis (CCA) algorithm is used to fuse the selected hypotheses and/or decisions associated with the training data.

9. The system of claim 8, wherein the CCA provides a mapping between one or more predictive models and behaviors exhibited by one or more drivers.

10. The system of claim 8, wherein the CCA utilizes pairwise interactions between predictors.

11. The system of claim 7, wherein the training data includes movement information from the one or more agents, and the movement information includes speed, heading, and location information.

12. The system of claim 7, wherein the one or more agents are mobile agents or stationary agents.

13. A non-transitory computer readable medium having program instructions embodied therewith, the program instructions readable by a processor to cause the processor to perform a method for providing path planning guidance by resolving multiple behavioral predictions associated with operating a vehicle, the method comprising:
installing a vehicle system in a vehicle, wherein the vehicle system provides path planning guidance based on training data using fused hypotheses and/or decisions associated with the training data, the vehicle system including a plurality of movement behavioral models;
determining a location of the vehicle on a map containing a road network;
determining whether one or more agents exist within a predetermined range of the vehicle;
generating a plurality of hypotheses for an agent within the predetermined range, wherein each hypothesis includes a path prediction of the agent generated by a different model of the plurality of models;
selecting multiple hypotheses from the plurality of hypotheses based on an accuracy of each of the plurality of hypotheses, and fusing the selected hypotheses to generate a fused hypothesis, the fused hypothesis specifying a single fused path prediction for the agent;
selecting an output trajectory based on the fused hypothesis to traverse the road network based on the location of the vehicle on the map and the existence of the agent, and
controlling operation of the vehicle using the output trajectory.

14. The computer readable storage medium of claim 13, wherein a Canonical Correlation Analysis (CCA) algorithm is used to fuse the selected hypotheses and/or decisions associated with the training data.

15. The computer readable storage medium of claim 14, wherein the CCA provides a mapping between one or more predictive models and behaviors exhibited by one or more drivers.

16. The computer readable storage medium of claim 13, wherein the training data includes movement information from the one or more agents, and the movement information from the one or more agents includes speed, heading, and location information.

17. The computer readable storage medium of claim 13, wherein the one or more agents are mobile agents or stationary agents.

* * * * *